United States Patent [19]
Showalter

[11] Patent Number: 5,975,615
[45] Date of Patent: Nov. 2, 1999

[54] GOLF CART ENCLOSURE AND WINDSHIELD BRACKET

[75] Inventor: Jerry M. Showalter, Wesley Chapel, Fla.

[73] Assignee: Tampa G Manufacturing Co., Inc., Tampa, Fla.

[21] Appl. No.: 09/102,027

[22] Filed: Jun. 22, 1998

[51] Int. Cl.[6] ....................................................... B60J 1/00
[52] U.S. Cl. .................... 296/96.21; 296/84.1; 296/77.1; 280/DIG. 5
[58] Field of Search .................................. 296/201, 96.21, 296/78.1, 84.1, 77.1, 136, 147, 138; 280/DIG. 5

[56] References Cited

U.S. PATENT DOCUMENTS

| | | | |
|---|---|---|---|
| 2,682,427 | 6/1954 | Bright | 296/77.1 X |
| 4,343,503 | 8/1982 | Samuelson et al. | 296/96.21 |
| 4,795,205 | 1/1989 | Gerber | 296/84.1 X |
| 5,192,109 | 3/1993 | Roberts | 296/84.1 |
| 5,385,379 | 1/1995 | Heavner | 296/84.1 |
| 5,385,380 | 1/1995 | Heavner | 296/84.1 |
| 5,791,720 | 8/1998 | Moore et al. | 296/96.21 X |

*Primary Examiner*—Joseph D. Pape
*Attorney, Agent, or Firm*—Stein, Schifino & Van Der Wall

[57] ABSTRACT

Enclosure and windshield retaining brackets for retaining a golf cart enclosure panel and a golf cart windshield in a position adjacent a golf cart windshield frame. The bracket has two preferred embodiments, the first embodiment having a U-shaped frame member for engagement with a windshield frame, and a longitudinal rail member for engagement with a bead portion of an enclosure panel, permitting linear movement of the bead portion along the length of the rail member and the second preferred embodiment having a U-shaped frame member, a longitudinal rail member, and a U-shaped windshield pane member for engagement with the windshield pane edge.

17 Claims, 4 Drawing Sheets

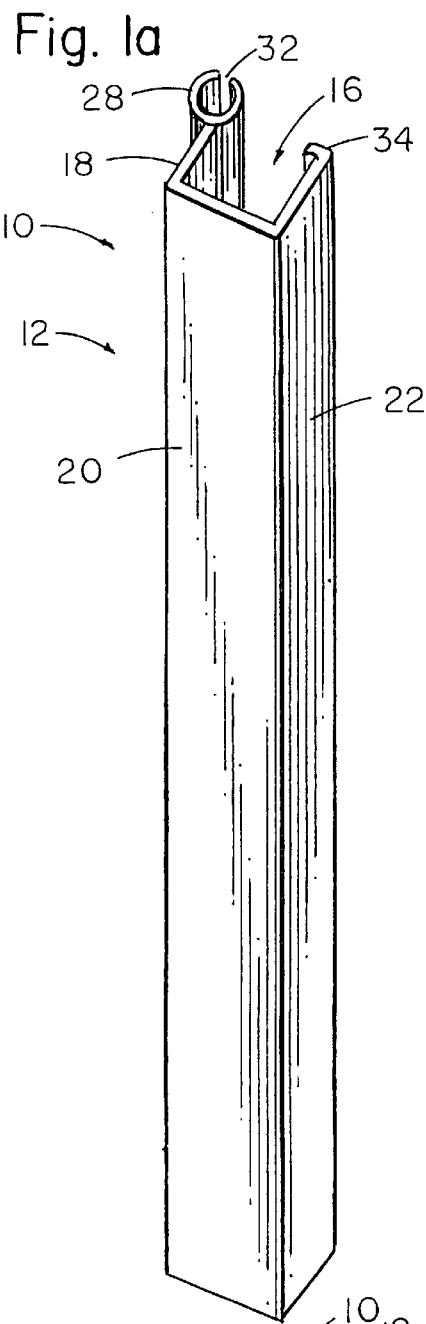
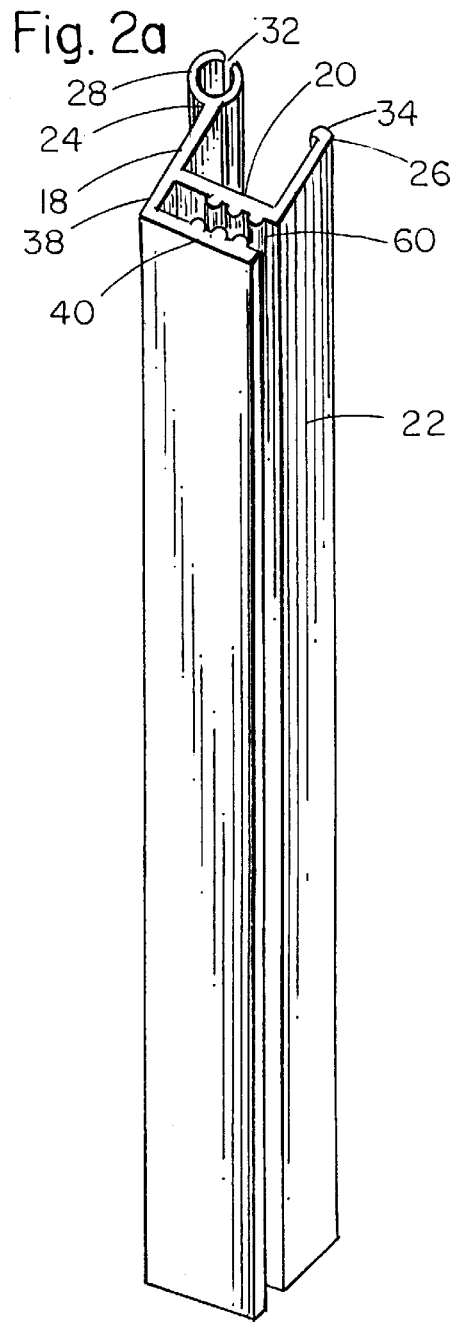
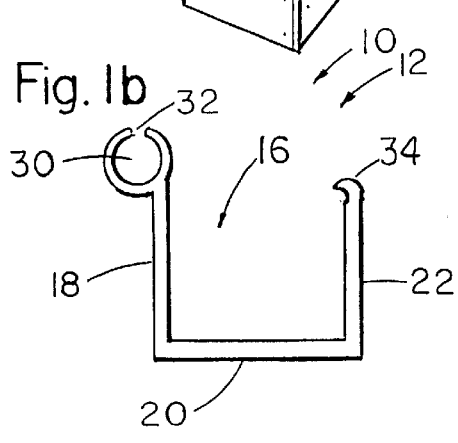
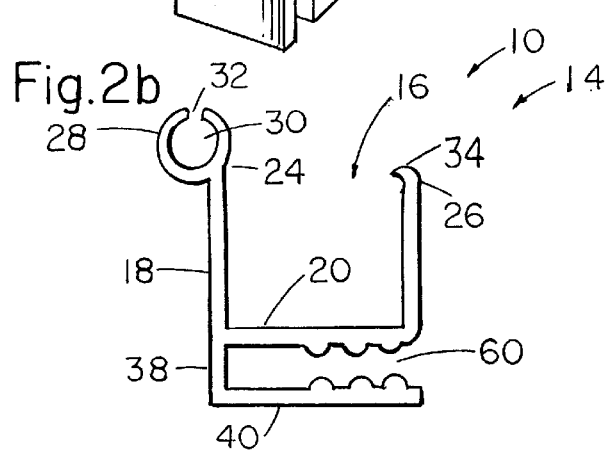

GOLF CART ENCLOSURE AND WINDSHIELD BRACKET

BACKGROUND OF THE INVENTION

1. Field of the Invention

This invention relates to all-weather enclosures and windshields for golf carts. More particularly, this invention relates to brackets for retaining a golf cart enclosure panel and a golf cart windshield in a position adjacent a golf cart windshield frame.

2. Description of the Background Art

Golf carts are typically motorized vehicles, gas or electric, that comprise a body portion, or carriage, including a driver's seat and a passenger seat with a storage area in the rear for storing a pair of golf bags in an upright position. Most golf carts include a roof structure supported above the body portion by a windshield frame and two rear, vertical supports. The windshield frame is typically a quadrangle structure, with two vertical portions and two horizontal portions. The roof structure provides at least partial protection to the golfers in the golf cart from precipitation or inclement weather, and also at least partially shades the golfers during sunny weather.

Golf cart roof structures do not provide complete protection since the front, rear and sides are open. Accordingly, there presently exist numerous types of enclosures for golf carts which are designed to provide added protection to the golfers seated therein. Generally, golf cart enclosures are composed of a canvas or vinyl material having a plurality of panels which are configured to be supported about the front, rear and side openings of the golf cart. The panels are often attached to each other by attachment means, such as zippers. The panels in some enclosures are suspended directly from the roof structure of the golf cart whereas others are suspended from a canvas or vinyl roof panel designed to be positioned over the roof structure of a golf cart so that the panels are suspended downwardly therefrom about the front, rear and side openings of the golf cart. Most importantly, the front and typically the rear and side panels include sections of transparent vinyl which function as windshields or windows permitting the golfers to see out of the golf cart when fully enclosed in the enclosure. Various means are provided for securing the lower edges of the panels to the lower edges of the golf cart in order to retain them in proper position. Representative golf cart enclosures are described and illustrated in U.S. Pat. Nos. 5,259,656, 4,621,859, 5,310,235, 4,773,694, 4,098,536 and 4,488,750, the disclosures of which are hereby incorporated by reference herein.

Typically, the enclosure panels are temporarily fastened to the lower edges of the golf cart or to the windshield frame so that, despite cart motion or wind gusts, the side panels stay vertically oriented, maintaining the integrity of the enclosure. Various means of securing the enclosure panels to the golf cart have been used. For example, straps been sewn to the panels to tie around the windshield frame or to the golf cart bottom edge. As one may expect, it has been found inconvenient and time consuming to tie and untie such straps. Snaps have also been used and have been found to be equally inconvenient to snap and unsnap.

The current state of the art for securing the enclosure panels to the golf cart windshield frame involves the use of a hook and loop fastener such as that known by the trademark "Velcro". Hook and loop fasteners have been used by adhering one component of the fastener (hook or loop) to the opposing edges of the enclosure side panels and adhering the other component of the fastener (loop or hook) to either the body portion's lower edge or the windshield frame's side surface. Unfortunately, however, due to the nature of the hook and loop fasteners, it is inconvenient and often difficult for the golfer to conscientiously align the edges of the enclosure panels with the corresponding golf cart surface and apply pressure in such a way as to mate hook and loop and thereby reliably secure the enclosure panels. Further, hook and loop fasteners tend to wear over time, accumulating thread debris within the hook component, thereby becoming less effective fasteners. It would be advantageous, therefore, to have a means of reliably and conveniently securing the enclosure panels while simultaneously preserving ease of occupant ingress and egress.

The earliest models of golf cart enclosures included four panels (front, rear and side panels) as described above. However, it was soon realized that most golfers kept the front panel rolled down to function as a windshield even during good weather conditions. Golfers particularly favored keeping the front panel rolled down to function as a windshield to block the flow of air during operation of the golf cart. These front panels soon became known as "soft" fronts or windshields, and were particularly favored by golfers during cooler weather and light rain, because the soft windshield sufficiently deflected oncoming air to keep the golfers comfortable during movement of the golf cart. In many situations, the soft windshields were left in place almost year round.

Windshields composed of transparent hard materials such as a transparent acrylic or glass, for golf carts were soon developed. These became known as "hard" windshields to distinguish them from the "soft" windshields composed of the transparent vinyl front panel of a golf cart enclosure. Indeed, golf cart enclosures were soon being manufactured as "four-sided" versions with a front panel having a soft front or windshield, paired side panels, and a rear panel and "three-sided" versions having only side panels and a rear panel intended to be used on golf carts with hard windshields.

Presently, there exist many types of hard windshields. Some are composed simply of a flat, hard transparent material that is permanently affixed to the front surface of the windshield frame, others are entirely removable and still others are connected to the windshield frame in such a manner that the windshield may be rolled on tracks, out of the way, up under the roof structure. Representative windshields for golf carts are described and illustrated in U.S. Pat. Nos. 5,195,797, 5,192,109, 5,110,174, 4,819,979, 4,795,205, 4,792,175, 4,773,695, 4,343,503, 4,014,589 and 3,958,826, the disclosures of which are hereby incorporated by reference herein.

One particular type of hard windshield consists of lower and upper sheets of transparent material, such as clear acrylic or polycarbonite, that are dimensioned to be positioned about the lower and upper openings of the golf cart, with the sides thereof secured to the vertical portions of the windshield frame, thereby functioning as lower and upper windshields. The mating edges of the lower and upper windshields are hinge connected together such as by means of a living hinge or the like. The opposing sides of the lower windshield are secured to the front surface of the vertical frame by means of threaded fasteners, rivets, or the like. Because of the living hinge, the upper portion windshield is permitted to fold down over the lower portion windshield in a stacked, parallel configuration such that the upper area of the front of the golf cart is "open". When desired, the upper portion windshield may then be pivoted upwardly to a position substantially planar with the lower portion windshield, thereby "closing" the upper area of the front of the golf cart. Fastener means are provided for securing the upper portion windshield in such a "closed" position. In the industry, these types of windshields became known as "hinged windshields".

Presently, there exists numerous means for securing the upper portion windshield of the hinged windshield of the golf cart to the windshield frame. Historically, a hook and loop fastener was first used by adhering one component of the fastener (hook or loop) to the opposing side edges of the upper portion windshield and adhering the other component of the fastener (loop or hook) to the vertical portions of the frame. In this manner, as the upper portion windshield is moved to the vertical, closed position, the components of the hook and loop fastener are engaged and securely retains the upper portion windshield in the closed position. Unfortunately, however, due to the nature of the hook and loop fasteners, it is sometimes difficult for the golfer to pull the hook and loop fastener apart in order to lower the upper portion windshield.

Another type of fastener for golf cart hinged windshields comprises generally U-shaped retainer clips that are dimensioned and configured to resiliently grasp about the windshield frame. Typically, one of these U-shaped clips is rigidly connected to each opposing side of the upper portion windshield such that when the upper portion windshield is closed, the U-shaped retainer clips snaps onto their respective portions of the windshield frame, thereby securing the upper portion windshield in its closed position. Importantly, the golfer can easily open the windshield since U-shaped clips of this structure can more easily release from the frame than hook and loop type fasteners.

Still another type of fastener for golf cart hinged windshields comprises a rubber latch. Rubber latches of this type are permanently affixed to the windshield frame. They include an L-shaped or U-shaped configuration that can be bent backward during closing of the upper portion windshield and then released to resiliently engage the opposing side edges of the upper portion windshield when closed. Unfortunately, rubber latches of this character tend to lose their inherent "memory" after repeated use thereby requiring replacement.

Still other types of fasteners for golf cart hinged windshields include articulated knobs or latches positioned through holes in the opposing sides of the upper portion windshield in such manner that when the upper portion windshield is closed, the knob or latch can be operated to rigidly engage into a hole in the frame or a bracket affixed to the frame, respectively. Unfortunately, articulated knobs and latches of this character require holes to be drilled through the opposing sides of the upper portion windshield, thereby increasing the manufacturing cost since acrylic is notch sensitive and relatively brittle. Moreover, repeated operation of the knob or latch of this character sometimes results in a degradation of the hole in the acrylic.

Still another type of latch has been patented by the applicant of the present invention (U.S. Pat. No. 5,568,953 the disclosure of which is incorporated by reference herein) for an improved retaining latch for golf cart hinged windshields. In the referenced patent, the applicant created an S-shaped latch which held the upper portion of a hinged windshield securely in place. The improved latch does not degrade over time and allows a person to easily latch or unlatch the upper portion of the hinged windshield on the golf cart.

Another type of hard windshield used on golf carts is a solid or one piece (no hinge) windshield. The one piece windshields, as well as the lower portion of the hinged windshields, require a retaining device to hold the windshield to the vertical portions of the windshield frame. The prior art uses a plastic bracket that is two "u" shaped slots that are positioned 90° to each other. The prior art teaches that the plastic brackets are to be slid onto the side edges of the lower part of the hinged windshield or onto the side edges of the solid windshield to an approximate middle location. Then either windshield is to be attached to the frame of the golf cart by placing the brackets over the frame allowing the "u" shaped portion to engage with the frame of the golf cart.

Still another type of latch has been taught by the applicant of the present invention (U.S. patent application Ser. No. 08/991,420, the disclosure of which is incorporated by reference herein) for a bracket for retaining golf cart windshields. The windshield retaining brackets have a generally S-shape configuration that are attachable to windshield frame of a golf cart. A first slot of the S-shaped retaining bracket is positioned about the frame and a second slot is positioned about the windshield.

While all the aforementioned windshield latches function to retain the golf cart windshield, none of them retain the golf cart enclosure.

Therefore, it is an object of this invention to provide an improvement which overcomes the aforementioned inadequacies of the prior art devices and provides an improvement which is a significant contribution to the advancement of the golf cart windshield and enclosure art.

Another object of this invention is to provide an improved retaining bracket for reliably and conveniently securing the enclosure panels of a golf cart while simultaneously preserving ease of occupant ingress and egress.

Another object of this invention is to provide an improved retaining bracket for use in connection with an enclosure and windshield for a golf cart, wherein the retaining bracket simultaneously retains the enclosure panels and the windshield adjacent to the windshield frame.

Another object of this invention is to provide an improved retaining bracket for use in connection with an enclosure and windshield for a golf cart, the enclosure having panels with first and second side edges, the windshield having a portion overlying the front of a windshield frame, the retaining bracket comprising a U-shaped frame member defined by a serially connected first longitudinal member, a first transverse member and a second longitudinal member, wherein the frame member is adapted for connection to the windshield frame. The first channel of the retaining bracket is positioned about the roof structure support and slid down each support of the golf cart. A longitudinal rail member is disposed upon the first longitudinal member, the rail member having a longitudinal bore. The enclosure bears a bead portion to which the rail bore is adapted to movably engage. A U-shaped window pane member is defined by the first transverse member, a second transverse member and a third longitudinal member. The window pane member is slid over the side edges of the windshield as the frame member of the bracket is slid over the windshield frame, thereby securely engaging the lower portion windshield to the windshield frame. The enclosure bead portion is then movably engaged with the rail member, thereby securely, but movably, engaging the golf cart enclosure to the retaining bracket.

The foregoing has outlined some of the pertinent objects of the invention. These objects should be construed to be merely illustrative of some of the more prominent features and applications of the intended invention. Many other beneficial results can be attained by applying the disclosed invention in a different manner or modifying the invention within the scope of the disclosure. Accordingly, other objects and a fuller understanding of the invention and the detailed description of the preferred embodiment in addition to the scope of the invention defined by the claims taken in conjunction with the accompanying drawings.

SUMMARY OF THE INVENTION

For the purpose of summarizing this invention, this invention comprises a retaining bracket for golf cart enclosures and windshields. More particularly, the retaining bracket of this invention includes a first preferred embodiment, or upper bracket, for engaging and securing a bead portion of a golf cart enclosure panel to a windshield frame.

Further, the retaining bracket of this invention includes a second preferred embodiment, or lower bracket, which fulfills the aforementioned function of the first embodiment while simultaneously retaining the golf cart windshield adjacent the golf cart windshield frame.

For purposes of the present invention, the term "bead portion" includes several elements that may extend from a side edge of a golf cart enclosure panel to engage with the bracket of the present invention. These elements include, but are not limited to, a hem, cleats, staggered beads, or a rod.

The upper bracket of the present invention includes a U-shaped frame member defined by a serially connected first longitudinal member, a first transverse member, and a second longitudinal member. The U-shaped frame member is adapted for connection with the golf cart windshield frame. The first longitudinal member, first transverse member, and the second longitudinal member are each substantially perpendicular to their respective serially connected members. The first longitudinal member has a longitudinal edge and the second longitudinal member has a longitudinal edge. Preferably, disposed upon said first longitudinal edge is a frame retaining means, such as a flange oriented perpendicular to said first longitudinal member. Further, a longitudinal rail member is disposed upon the longitudinal edge of the first longitudinal member. The rail member includes a longitudinal bore which is adapted for movably engaging with the bead portion. Further, the rail member bore defines a longitudinal slot which is smaller in diameter than the rail member bore so that, when engaged to the rail member, the bead portion is movably retained. It is preferable that the rail member bore have a circular cross-section. The frame member of the retaining bracket is positioned about the windshield frame and slid to its desired location on the frame. The enclosure bead portion is then movably engaged with the rail member, thereby securely, but movably, engaging the golf cart enclosure to the retaining bracket. Once engaged endwise, the bead portion is permitted to move linearly along the length of the longitudinal bore for ease of full engagement and disengagement.

The upper bracket is useful particularly for golf carts with hinged windshields, wherein the upper bracket is engaged along the upper vertical portion of the windshield frame, adjacent to the upper pivoting windshield pane.

The lower bracket of the present invention has all the aforementioned elements and properties of the upper bracket with the addition of a U-shaped window pane member defined by a serially connected third longitudinal member, a second transverse member, and the first transverse member, wherein the U-shaped window pane member is adapted to engage with a windshield edge. The U-shaped frame member of the retaining bracket is positioned about the windshield frame and slid to the desired location on the frame. The U-shaped window pane member is slid over the side edges of the windshield as the frame member of the bracket is slid over the frame, thereby securely engaging the lower portion windshield to the windshield frame. The bead portion is then movably engaged with the longitudinal bore, endwise, thereby securely, but movably, engaging the golf cart enclosure panel to the retaining bracket.

Preferably, the lower bracket U-shaped pane member includes means for retaining the windshield edge, such as a saw-toothed configuration.

The lower bracket is useful for retaining enclosures and fixed, or single pane, windshields, but is also particularly useful for hinged windshields. When used with hinged windshields, the lower bracket is used in tandem with the upper bracket, the lower bracket being engaged along the lower portion of the windshield frame, adjacent the stationary, or non-pivoting, pane of the hinged windshield, engaging it. The upper bracket is engaged along the upper portion of the windshield frame, adjacent the upper movable, or pivoting, pane of the hinged windshield, but not engaging it (the upper bracket has no windshield pane member to engage with the windshield). Therefore, the golf cart enclosure panel and the lower stationary pane of the windshield are securely retained while the upper, movable pane is permitted to pivot as needed.

One advantage over the prior art is that the windshield and enclosure side panels of the golf cart may be retained adjacent the windshield frame by utilization of a single device.

In addition to its dual function, another advantage of this invention is that it provides an improved retaining bracket for reliably and conveniently securing the enclosure panels of a golf cart while simultaneously preserving ease of occupant ingress and egress.

The foregoing has outlined rather broadly the more pertinent and important features of the present invention in order that the detailed description of the invention that follows may be better understood so that the present contribution to the art can be more fully appreciated. Additional features of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a fuller understanding of the nature and objects of the invention, reference should be made to the following detailed description taken in connection with the accompanying drawings in which:

FIG. 1a is an enlarged, perspective view of the first preferred embodiment, or upper bracket, of the present invention;

FIG. 1b is a plan view of the upper bracket of the present invention;

FIG. 2a is an enlarged, perspective view of the second preferred embodiment, or lower bracket, of the present invention;

FIG. 2b is a plan view of the lower bracket of the present invention;

DETAILED DESCRIPTION OF THE PREFERRED EMBODIMENT

Referring to FIGS. 1a and 1b, the retaining bracket 10 of this invention includes a first preferred embodiment, or upper bracket 12.

Further, the retaining bracket of this invention includes a second preferred embodiment, or lower bracket 14, as shown in FIGS. 2a and 2b.

Figure 3:
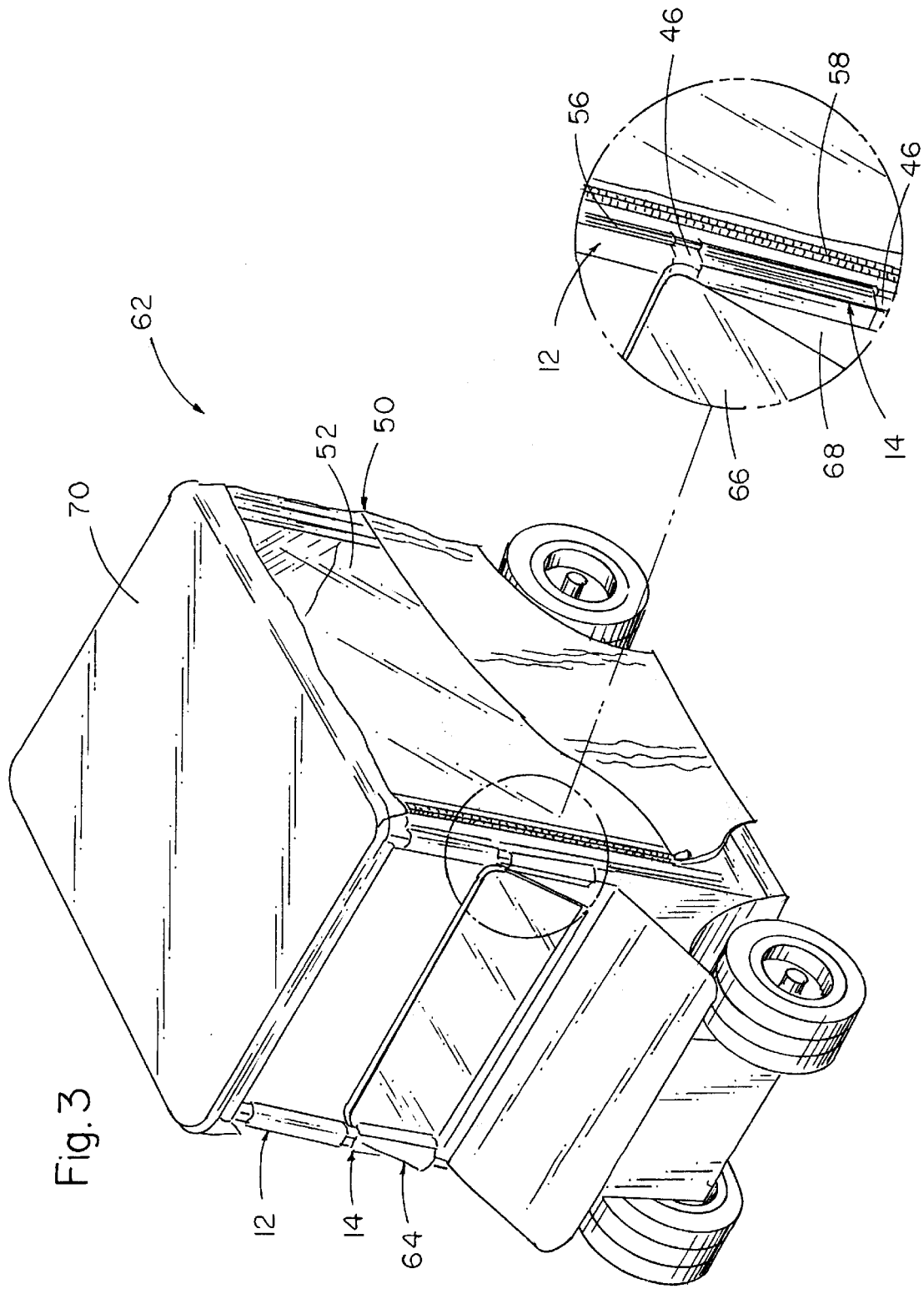
FIG. 3 is a perspective view, with an enlargement, of a golf cart with a hinged windshield, illustrating both the upper and lower bracket embodiments engaged about the windshield frame.

As shown in FIGS. 1a and 1b, the upper bracket 12 of the present invention includes a U-shaped frame member 16 defined by a serially connected first longitudinal member 18, a first transverse member 20, and a second longitudinal member 22. The U-shaped frame member 16 is adapted for connection with a golf cart windshield frame 46, as shown in FIG. 3. The first longitudinal member 18, first transverse member 20, and the second longitudinal member 22 are each substantially perpendicular to their respective serially connected members. The first longitudinal member 18 has a longitudinal edge 24 and the second longitudinal member has a longitudinal edge 26. Preferably, disposed upon said first longitudinal edge 24 is a frame retaining means, such as a flange 34 oriented perpendicular to said first longitudinal member 18. Further, a longitudinal rail member 28 is disposed upon the longitudinal edge 24 of the first longitudinal member 18. The rail member 28 includes a longitudinal bore 30 which is adapted for movably engaging with a golf cart enclosure 50, as shown in FIG. 3. Specifically, the longitudinal bore 30 is adapted for engaging with a bead portion 56 of a golf cart enclosure side panel 52, as shown in FIG. 3. Further, the rail member bore 30 defines a longitudinal slot 32 which is smaller in diameter than the rail member bore 30 so that, when engaged to the rail member 28, the bead portion 56 is movably retained. It is preferable that the rail member bore 30 have a circular cross-section. The frame member 16 of the upper bracket 12 is positioned about the windshield frame 46 and slid to its desired location on the frame 46, as shown in FIG. 3. The enclosure bead portion 56 is then movably engaged with the rail member 28, thereby securely, but movably, engaging the golf cart enclosure 50 to the upper bracket 12. Once engaged endwise, the bead portion 56 is permitted to move linearly along the length of the longitudinal bore 30 for ease of full engagement and disengagement.

The upper bracket 12 is useful particularly for a golf cart 62 with a hinged windshield 64, as shown in FIG. 3. Such hinged windshields 64 have an upper pivoting pane 66 and lower non-pivoting pane 68, wherein the upper bracket 12 is engaged along the windshield frame 46, adjacent the upper pivoting pane 66, as shown in FIG. 3.

Figure 4:
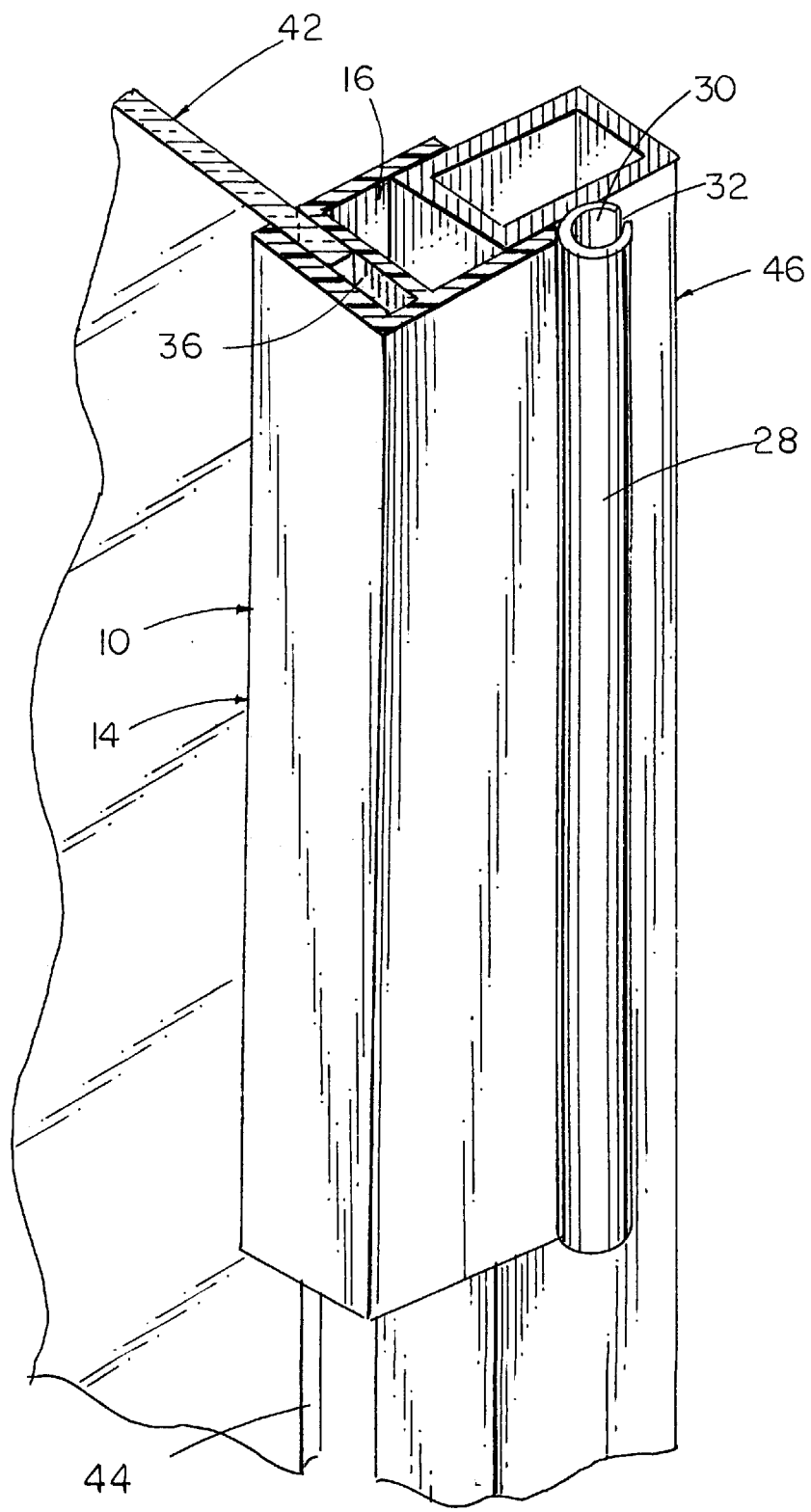
FIG. 4 is an enlarged partial cross-sectional view of the windshield frame of a golf cart and an enlarged cross sectional view of a windshield illustrating a windshield partially secured by means of the retaining bracket of the present invention.

As shown in FIGS. 2a and 2b, the lower bracket 14 of the present invention has all the aforementioned elements and properties of the upper bracket 12 with the addition of a U-shaped window pane member 36 defined by a serially connected third longitudinal member 38, a second transverse member 40, and said first transverse member 20, wherein the U-shaped window pane member 36 is adapted to engage with a windshield edge 44, as shown in FIG. 4. The U-shaped frame member 16 of the lower bracket 14 is positioned about the windshield frame 46 and slid to the desired location on the frame 46, as shown in FIG. 4. The U-shaped window pane member 36 is slid over the side edges 44 of the windshield 42 as the frame member 16 of the lower bracket 14 is slid over the frame 46, thereby securely engaging the windshield 42 to the windshield frame 46. The bead portion 56 is then movably engaged with the longitudinal bore 30, endwise, thereby securely, but movably, engaging the golf cart enclosure panel 52 to the lower bracket 14.

Preferably, as shown in FIGS. 2a and 2b, the lower bracket U-shaped pane member 36 includes means for retaining the windshield edge 44, such as a saw-toothed configuration 60.

The lower bracket 14 is useful for retaining enclosures 50 and fixed, or single pane, windshields (not shown), but is also particularly useful for hinged windshields 64. As shown in FIG. 3, when used with hinged windshields 64, the lower bracket 14 is used in tandem with the upper bracket 12, the lower bracket 14 being engaged along the lower portion of the windshield frame 46, adjacent the lower non-pivoting pane 68 of the hinged windshield 64, engaging it. The upper bracket 12 is engaged along the upper portion of the windshield frame 44, adjacent the upper pivoting pane 66 of the hinged windshield 64, but not engaging it (the upper bracket 12 has no windshield pane member 36 to engage with the windshield 42). Therefore, the golf cart enclosure panel 52 and the lower non-pivoting pane 68 of the hinged windshield 64 are securely retained while the upper pivoting pane 66 is permitted to pivot as needed, as shown in FIG. 3.

Figure 5:
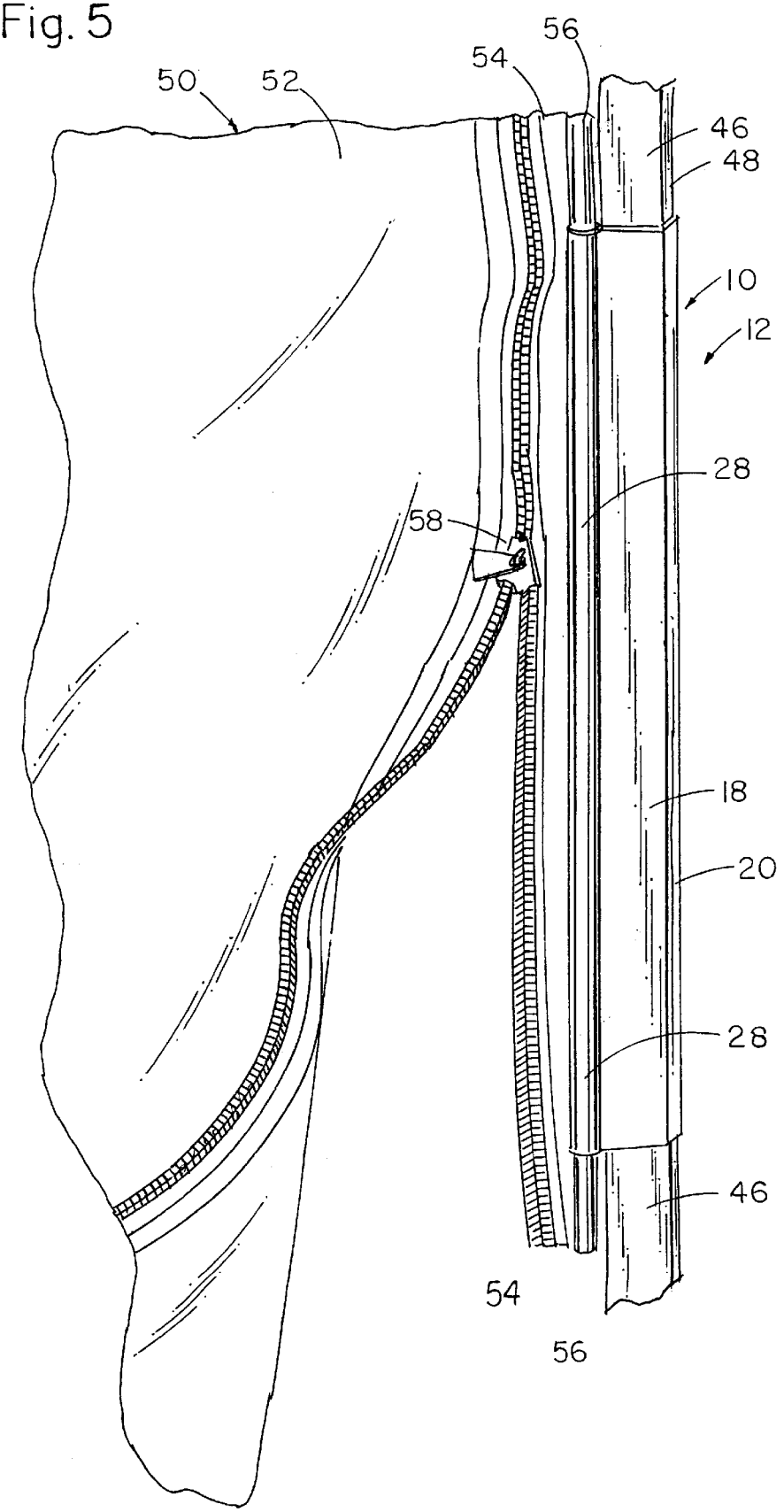
FIG. 5 is a perspective view of the upper bracket of the present invention, illustrating the bracket's engagement with both the windshield frame and the beaded portion of an enclosure panel, the panel bearing a zipper. Similar reference characters refer to similar parts throughout the several views of the drawings.

FIG. 4 illustrates partial engagement of the lower bracket 14 with the windshield frame 46 and windshield edge 44. FIG. 5 illustrates engagement of the bead portion 56 with the longitudinal rail member 28. The bead portion 56 extends from a side edge 54 of the enclosure panel 52. The enclosure panel 52 may include a zipper 58, as shown in FIG. 5.

For purposes of the present invention, the term "bead portion" 54 includes several elements that may extend from a side edge 54 of a golf cart enclosure panel 52. These elements include, but are not limited to, a hem, cleats, staggered beads, a rod, or a combination thereof (not shown).

It should be understood that the golf cart 62 has a roof structure or vinyl canopy 70, as shown in FIG. 3, and it is necessary for the uppermost part of the bead portion 56 to be somehow connected to the cart canopy 70, or for the bead portion 56 to include a portion (not shown) that has a thickness larger than the diameter of the longitudinal bore 30, to act as an anchor, so that, when the bead portion 56 is engaged with the bracket 10, it will be suspended and kept from dropping through the bottom-most portion of the longitudinal bore 30. It is noted that, as shown in FIG. 3, it is preferable that the retaining bracket 10 of the invention be installed at corresponding edges 44 of the windshield 42 or hinged windshield 64.

It is also noted that the width of the U-shaped frame member 16 is substantially equal to the thickness of the windshield frame 46 and the width of the U-shaped windshield pane member 36 is substantially equal to the thickness of the windshield 42.

Further, it should be understood that the term "windshield frame" 46, for the purposes of this invention, includes, but is not limited to, such functional equivalents as upright roof structure supports and other structures on a golf cart to which the bracket frame member 16 could be adapted to engage.

In addition, while it is preferable that the longitudinal slot 32 be oriented so that, when the retaining bracket 10 is engaged, the longitudinal slot 32 is facing the rear of the golf cart 62, it should be understood that the longitudinal slot 32 may be oriented so that it is facing any direction, such as, for example, lateral of the golf cart 62.

Finally, while the longitudinal rail member 28 may be integrated with the U-shaped frame member 16 subsequent to the formation of the frame member 16, it is preferable that both the upper and lower brackets be integrally formed of a resilient material, such as plastic. Further, the simple, linear designs of both preferred embodiments lend themselves to being extruded to the desired lengths.

The present disclosure includes that contained in the appended claims, as well as that of the foregoing description. Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and scope of the invention.

Now that the invention has been described,

What is claimed is:

1. A golf cart enclosure retaining bracket for engaging and securing a bead portion of a golf cart enclosure panel to a frame, said bracket comprising:

a U-shaped frame member defined by a serially connected first longitudinal member, a first transverse member, a second longitudinal member adapted for connection to said frame;

a longitudinal rail member having a longitudinal bore adapted for receiving said bead portion; and means for connecting said longitudinal bore to a longitudinal edge of said first longitudinal member.

2. The bracket as set forth in claim 1, wherein said first longitudinal member, said first transverse member, and said second longitudinal member of said bracket are each substantially perpendicular to their respective serially connected members.

3. The bracket as set forth in claim 1, wherein said rail member further includes a longitudinal slot defined by said longitudinal bore.

4. The bracket as set forth in claim 1, wherein said bead portion is a hem, and wherein said longitudinal bore and said longitudinal slot are adapted to movably engage and retain said hem, while permitting linear movement of said hem.

5. The bracket as set forth in claim 1, wherein said second longitudinal member further defines a flange, perpendicularly disposed on said first longitudinal member longitudinal edge to facilitate retaining engagement between said frame member and said frame.

6. The bracket as set forth in claim 1, wherein said longitudinal bore has a substantially circular cross-section.

7. The bracket as set forth in claim 1, wherein said connecting means is through integral formation of said frame member with said longitudinal rail member.

8. A golf cart enclosure and windshield retaining bracket for interconnecting a golf cart enclosure panel, golf cart windshield, and golf cart windshield frame, said bracket comprising:

a U-shaped frame member defined by a serially connected first longitudinal member, a first transverse member, a second longitudinal member adapted for connection to said windshield frame;

a longitudinal rail member having a longitudinal bore adapted for receiving said bead portion;

means for connecting said longitudinal bore to a longitudinal edge of said first longitudinal member; and a U-shaped window pane member defined by a serially connected third longitudinal member, a second transverse member, and said first transverse member.

9. The bracket as set forth in claim 8, wherein said first longitudinal member, said first transverse member, and said second longitudinal member of said bracket are substantially perpendicular to their respective serial members.

10. The bracket as set forth in claim 8, wherein said second longitudinal member further defines a flange, perpendicularly disposed on said second longitudinal member longitudinal edge to facilitate retaining engagement between said frame member and said golf cart windshield frame.

11. The bracket as set forth in claim 8, wherein said frame member is larger than said window pane member.

12. The bracket as set forth in claim 8, wherein said window pain member further includes means to retain engagement with said windshield.

13. The bracket as set forth in claim 12, wherein said retaining means is a saw-toothed configuration.

14. The bracket as set forth in claim 8, further including a zipper interposed in said panel for allowing ingress and egress, including a hem, and wherein said longitudinal bore and said longitudinal slot are adapted to movably engage and retain said hem, while permitting linear movement of said hem.

15. The bracket as set forth in claim 8, wherein said bracket is integrally formed.

16. The bracket as set forth in claim 8, wherein said longitudinal bore has a substantially circular cross-section.

17. Paired retaining brackets for interconnecting a golf cart enclosure panel, golf cart hinged windshield, and golf cart windshield frame, said paired brackets comprising:

an upper bracket and a lower bracket, said upper bracket including a U-shaped frame member defined by a serially connected first longitudinal member, a first transverse member, and a second longitudinal member adapted for connection to said windshield frame, wherein said first longitudinal member, said first transverse member, and said second longitudinal member of said upper bracket are each substantially perpendicular to their respective serially connected members, and wherein said first longitudinal member defines a longitudinal edge and said second longitudinal member defines a longitudinal edge, and wherein said first longitudinal member defines a longitudinal edge and said second longitudinal member defines a longitudinal edge, a longitudinal rail member disposed upon said first longitudinal member longitudinal edge, said longitudinal rail member having a longitudinal bore adapted for receiving said hem and having a circular cross-section, said longitudinal bore defining a longitudinal slot, wherein said longitudinal bore and said longitudinal slot are adapted to movably engage and retain said hem, while permitting linear movement of said hem, a flange perpendicularly disposed upon said second longitudinal member longitudinal edge to facilitate retaining engagement between said frame member and said golf cart windshield frame, wherein said first bracket is integrally formed; said lower bracket including

- a U-shaped frame member defined by a serially connected first longitudinal member, a first transverse member, and a second longitudinal member adapted for connection to said windshield frame, wherein said first longitudinal member, said first transverse member, and said second longitudinal member of said upper bracket are each substantially perpendicular to their respective serially connected members, and wherein said first longitudinal member defines a longitudinal edge and said second longitudinal member defines a longitudinal edge,
- a longitudinal rail member disposed upon said first longitudinal member longitudinal edge, said longitudinal rail member having a longitudinal bore adapted for receiving said hem and having a circular cross-section, said longitudinal bore defining a longitudinal slot, wherein said Longitudinal bore and said longitudinal slot are adapted to movably engage and retain said hem, while permitting linear movement of said hem,
- a flange perpendicularly disposed upon said second longitudinal member longitudinal edge to facilitate retaining engagement between said frame member and said golf cart windshield frame,
- a U-shaped window pane member defined by a serially connected third longitudinal member, a second transverse member, and said first transverse member, wherein said window pane member is adapted for engaging and retaining a lower, non-pivoting windshield pane, and wherein said first longitudinal member, said first transverse member, and said second longitudinal member of said lower bracket are substantially perpendicular to their respective serial members, wherein said window pane member includes a saw-toothed configuration to retain engagement with said windshield, and wherein said lower bracket is integrally formed.

* * * * *